United States Patent [19]

Hoegh

[11] 4,412,483

[45] Nov. 1, 1983

[54] SPIRAL MEAT SLICER

[75] Inventor: Poul E. Hoegh, San Jose, Calif.

[73] Assignee: Country Baked Hams, Inc., San Jose, Calif.

[21] Appl. No.: 209,197

[22] Filed: Nov. 20, 1980

[51] Int. Cl.[3] .......................... A23N 7/00; A47J 17/00

[52] U.S. Cl. .......................................... 99/538; 99/537; 99/593; 99/594; 99/597

[58] Field of Search ................. 99/486, 491, 492, 537, 99/538, 541, 593, 594, 595–599; 17/1 G; 82/48; 83/451, 471.2, 483, 488

[56] References Cited

U.S. PATENT DOCUMENTS 2,599,328 6/1952 Hoenselaar ........................ 99/537 X 4,287,820 9/1981 Urban ................................... 99/538

*Primary Examiner*—Timothy F. Simone

*Attorney, Agent, or Firm*—Thomas E. Schatzel

[57] ABSTRACT

A spiral meat slicer is provided particularly for slicing ham, wherein a ham is mounted vertically on a slowly rotating spiked platform. A rotating, substantially horizontal disk blade is pivotally mounted on the meat slicer to permit the blade to be biased by spring means toward and into the ham to spirally cut the ham to the bone. A non-rotating arm is carried in bearings below the spiked platform, this arm reaching up above the ham and containing a spiked, rotatable top support that is pressed into the top portion of the ham to steady the ham against pressure of the cutting blade. The spiked platform is mounted on a vertical lead screw, that causes the ham to be lowered steadily as the ham rotates to produce a spiral cut around the ham bone. The weight of the ham aids in moving the ham down steadily, permitting the ham to be automatically sliced substantially from one end to the other, including around the aitch bone without requiring manual manipulation. Means are provided to keep the blade from entering the ham until a fractional nut has engaged into the lead screw thread and to disengage the blade from the ham and return the blade to start position upon the spiral having reached the top portion of the ham. Short or long hams are automatically gauged by the machine and only one motor is required to drive all the mechanisms in the spiral meat slicer. Upon the spiral cut ham being removed from the spiked platform, a release button may be pushed, causing the spiked platform to automatically move to its top position ready for a new ham to be placed thereon for slicing.

6 Claims, 9 Drawing Figures

SPIRAL MEAT SLICER

The present invention relates to food processing machines and more particularly to a spiral meat slicer especially for slicing hams containing a ham bone that may include a non-uniform aitch bone extending from a substantially central bone structure outward toward the surface of the ham.

The slicing of hams in the industry has long provided a number of problems particularly due to the generally L-shaped construction of the ham bone. Several machines have been devised to spiral slice hams, such as one disclosed under U.S. Pat. No. 3,153,436 in which a reciprocating knife is utilized to spiral slice a ham, such a knife, due to the short length of the cutting edge, requiring regrinding comparatively often, the rapid reciprocating speed of the knife, required to provide clean cutting action, causing an extremely high level of noise during operation of the machine that is extremely objectionable and may be hazardous to the hearing health of the operator.

In U.S. Pat. No. 3,951,054, a spiral meat slicer utilizing a rotating disk blade is shown in which a ham rotates on a revolving platform while the disk blade moves slowly upward on a lead screw, the disk blade being driven by a separate motor on a horizontally pivoting arm, a second motor driving the revolving platform. Due to the fact that the blade arm carries a drive motor, making it comparatively heavy, extra power is required to move it up a lead screw during the slicing operation, furthermore, inertia problems are encountered during operation making it difficult for the machine to slice a ham around the aitch bone due to inertia slowing down blade motion at a time when the blade must rapidly move in and out of the ham at the aitch bone location, wherefore it has been necessary to provide this ham slicer with manual means to enable it to slice around the aitch bone manually, thus preventing total automatic operation of spiral slicing from one end of the ham to the other thus slowing down the slicing operation.

In order to overcome the above and other difficulties and deficiencies, it is an object of the present invention to provide a spiral meat slicer in which the meat is moved axially downwards during the slicing operation, thereby utilizing the weight of the meat to aid in the downward movement and thus reduce the power requirement for the platform drive system upon which the meat is located.

It is another object of this invention to provide a spiral meat slicer that is fully automatic in action, requiring only that the operator locate the meat to be sliced, such as a ham, between a spiked platform, and a spiked top plate, push a start button to initiate the slicing operation, wait until the slicing machine has completed the slicing operation, has returned the slicing blade arm to its start position and has shut off the spiral slicer, after which the operator removes the fully sliced ham from the spiked platform, pushes a return button to return the spiked platform to its upper start position, and locates a new ham to be sliced on the spiked platform.

It is another object of the invention to provide a spiral meat slicer that utilizes only one motor to drive all the mechanisms required to complete the automatic operation of the ham slicer as above.

It is still another object of the invention to provide a spiral meat slicer incorporating a very light-weight blade-carrying arm that does not carry motor means to drive the blade, thereby reducing inertia of the arm, and making it possible for the blade to move rapidly in and out of the ham as it, for instance, encounters the ham bone and the aitch bone, without requiring excessive pressure on the blade as it is biased in towards the ham bone, thereby reducing wear on the cutting edge of the blade and ensuring as complete slicing of the ham as possible.

It is a further object of the invention to provide a spiral meat slicer utilizing a substantially horizontal disk blade having a circumferential cutting edge of very considerable length to extend the lifetime of the cutting edge and reduce down time due to requiring to regrind the cutting edge.

It is another object of this invention to provide a spiral meat slicer that will accept different sizes of hams, yet will automatically stop slicing operation at a predetermined distance from the top of the ham independent of ham length.

It is yet another object of this invention to provide a spiral meat slicer that will spiral slice a ham from substantially one end of the ham to the other including over the aitch bone, without requiring manual manipulation of the blade arm around the aitch bone, and blade constantly slicing fully down to the bone yet easily and rapidly moving in and out of the ham as the bone demands it.

It is still another object of this invention to provide a spiral meat slicer that, upon starting up the machine, will hold back the blade until the nut has engaged in the thread of the lead screw governing the motion of the spiked platform, so that the blade will go directly into a spiral cut on the ham instead of making an initial circular cut.

It is yet another object of this invention to provide a spiral meat slicer that will automatically return the blade to its start position upon a ham having been sliced, and hold it there until a new ham is located on the platform ready for slicing.

It is finally another object of the invention to provide a spiral meat slicer that includes means for automatically returning the spiked platform to upper start position upon the push of a button.

These and other objects of this invention will become apparent from the following description and independent claims as referenced in the accompanying drawings.

IN THE DRAWINGS

Figure 1:
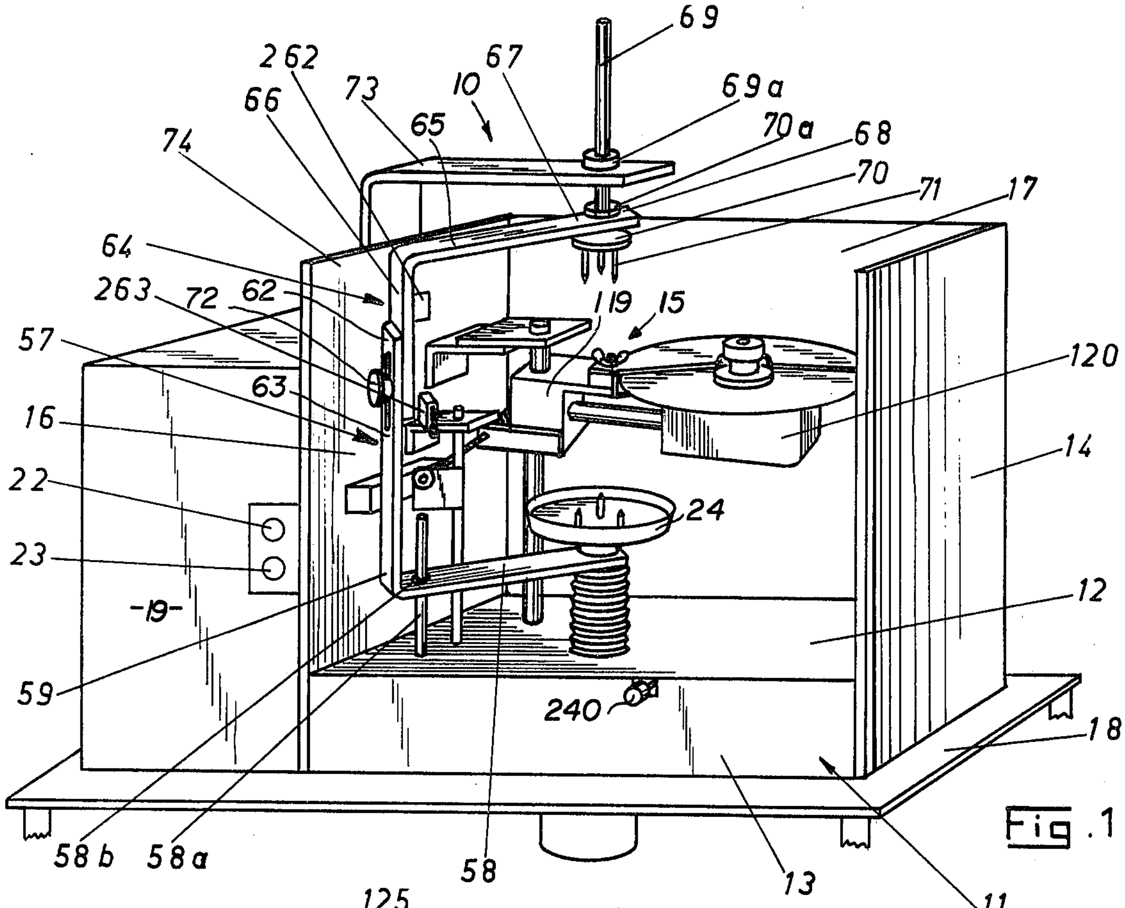
FIG. 1 is a perspective view of one embodiment of a spiral meat slicer incorporating the present invention.
Figure 5:
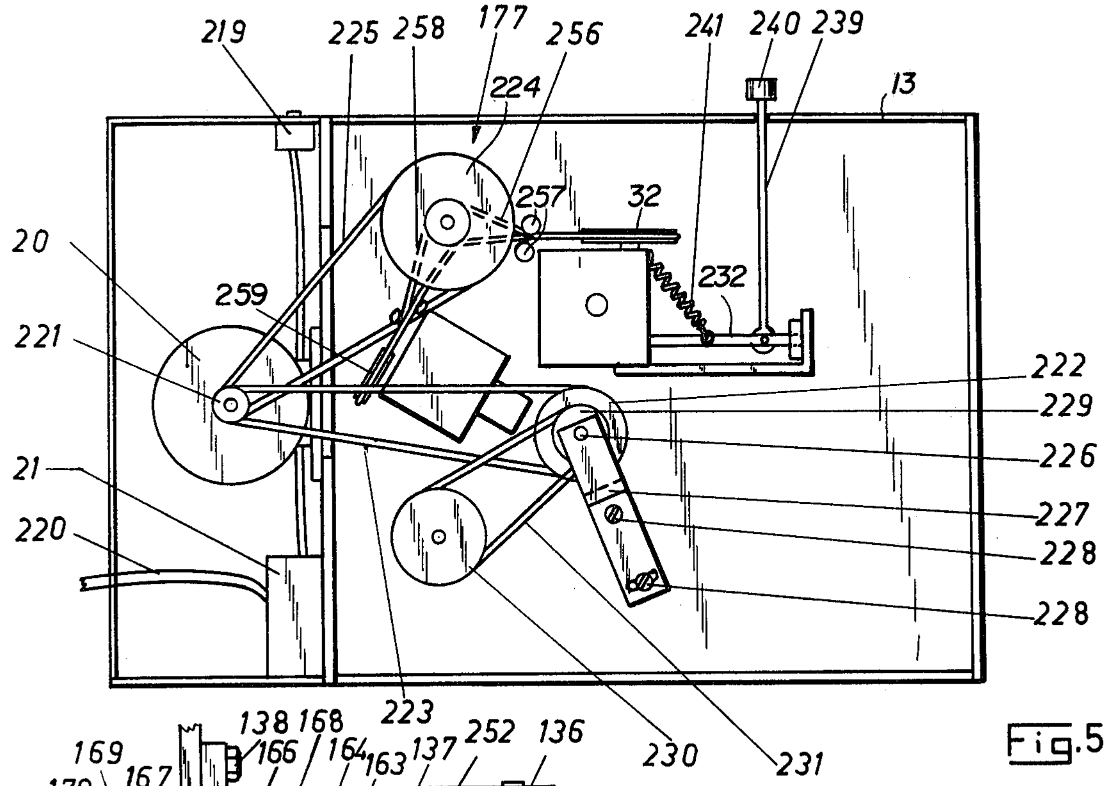

FIG. 5 is a reverse plan view of the embodiment shown in FIG. 1, illustrating the drive train transferring power from the single drive motor to the blade transmission and to a double clutch mechanism that selectively provides drive power to the lead screw of the spiked platform and to the blade arm return mechanism, showing also the push button link that permits return of the spiked platform to its upper position.

Figure 6:
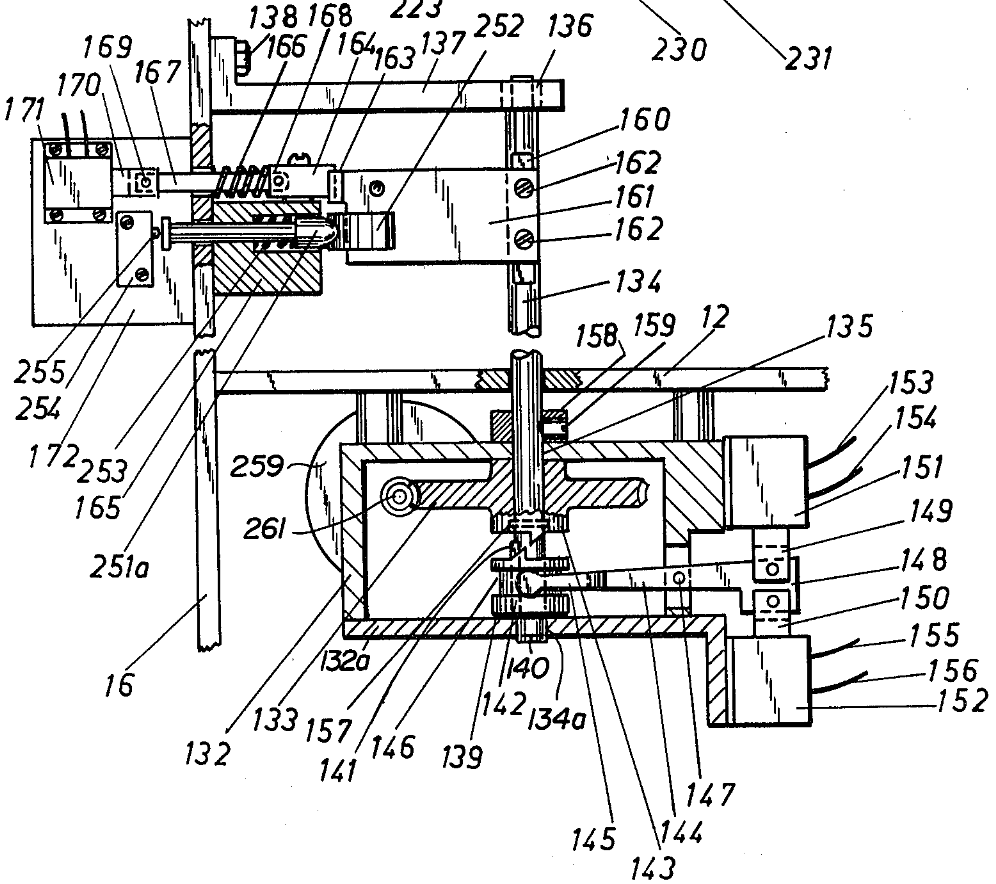

FIG. 6 is a part-sectional side elevation of the blade arm arresting and release mechanism, and the drive mechanism that returns the blade arm to start position upon a ham slicing operation having been completed.

Figure 7:
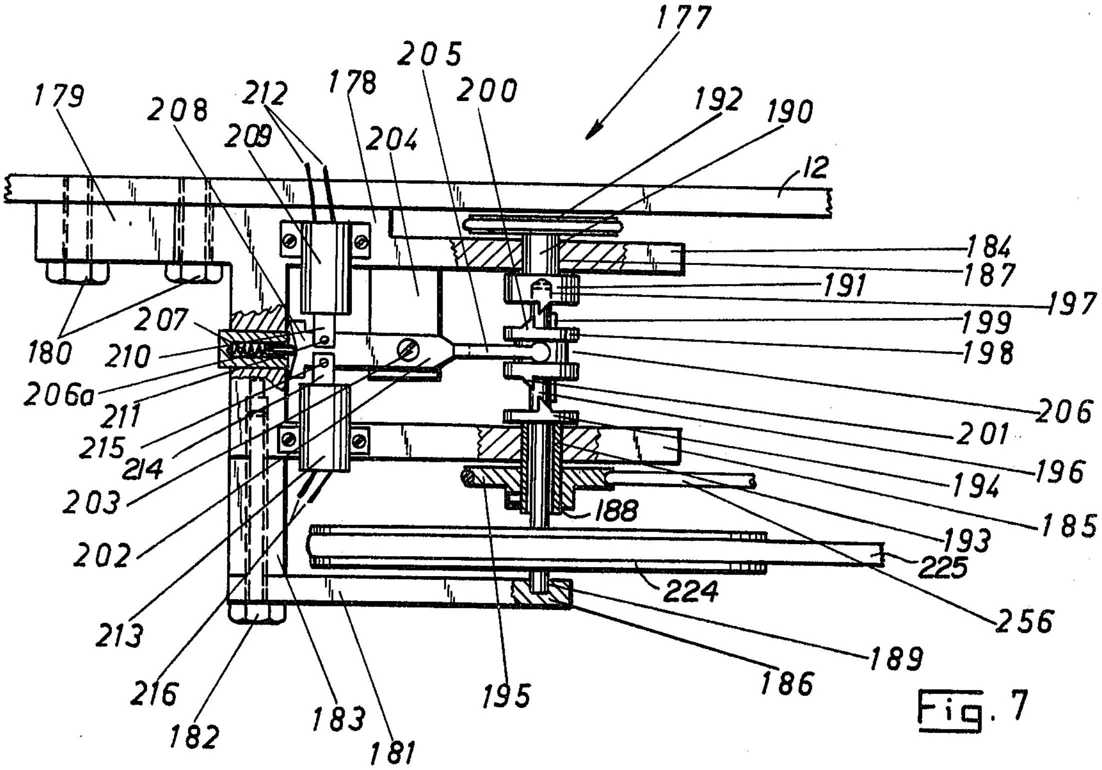

FIG. 7 is a part sectional side elevation of a double cluth, selective drive mechanism that in one position will provide drive means to rotate the spiked platform and in the other position will provide drive means to the blade arm return mechanism.

Figure 8:
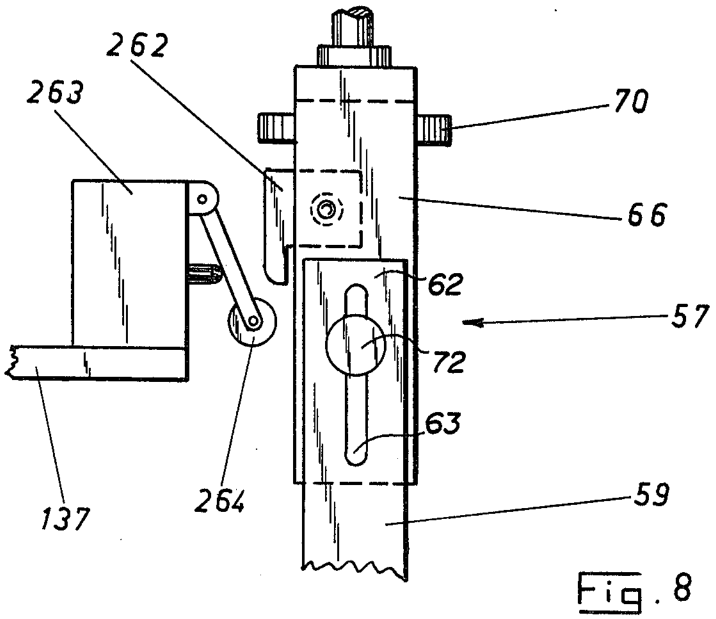

FIG. 8 is a fractional elevation of the meat clamping bracket, illustrating mechanism to stop platform rotation and initiate return motion of blade to start position.

Figures 4, 9:
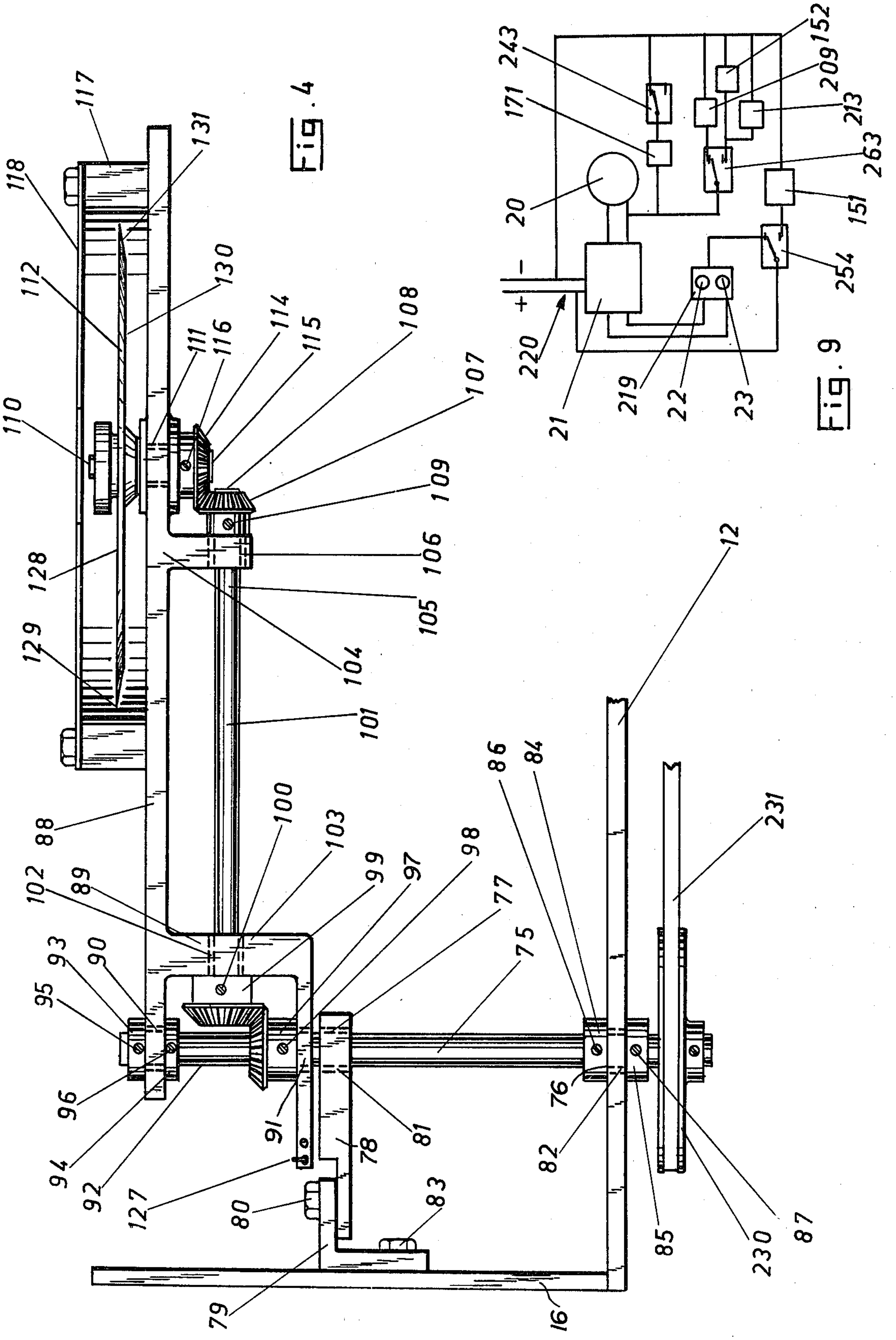
FIG. 4 is a side-elevational view of the pivoting arm carrying the cutting blade and of the transmission mechanism utilized to drive the cutting blade.

FIG. 9 is a schematic drawing of the electrical circuits connecting the electrical components utilized in the present invention.

DETAILED DESCRIPTION OF THE EMBODIMENT OF THE INVENTION

Figure 2:
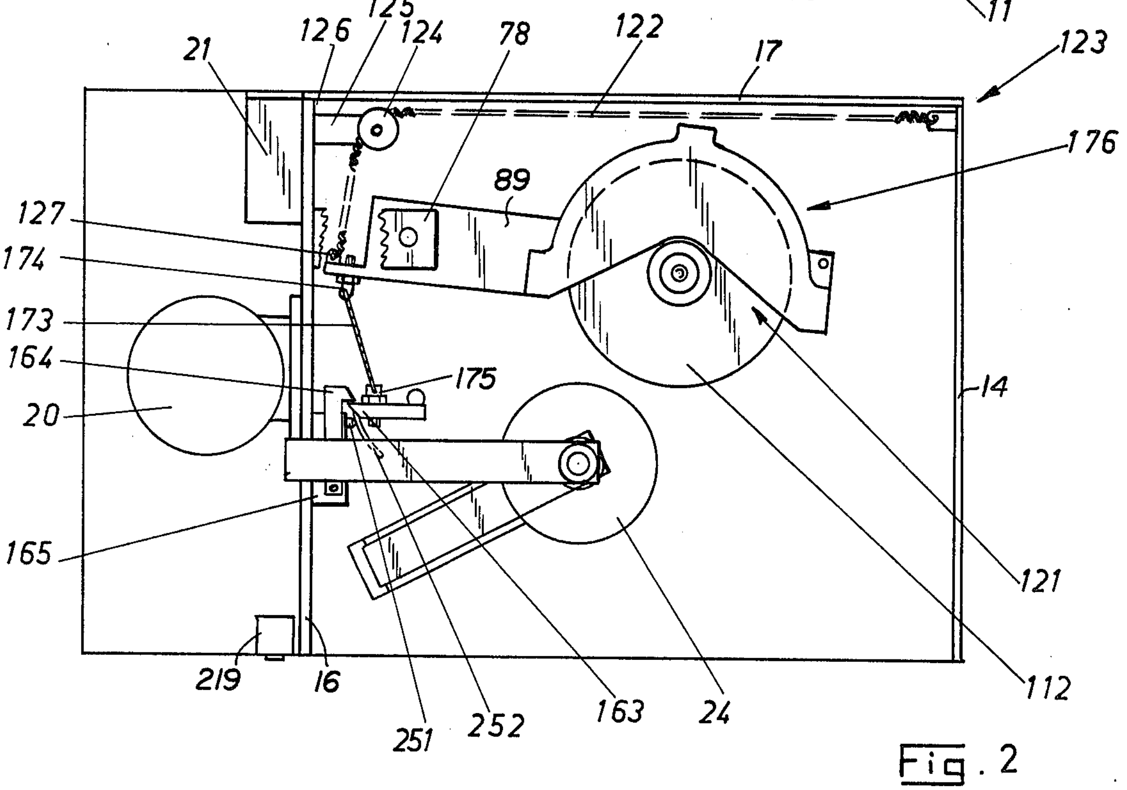
FIG. 2 is a top plan view of the embodiment shown in FIG. 1.

Referring to FIGS. 1 and 2, the spiral meat slicer, generally shown at 10, comprises a base cabinet 11 that contains the main drive mechanisms and comprises a main support plate 12, having a downward depending, removable front cover 13, a right side plate 14 that depends downward from main support plate 12 for a distance equal to that of the front cover 13 and upward from main support plate 12 a sufficient distance to cover mechanisms 15 located on top of main support plate 12. A left side plate 16 extends downward on left side of main support plate 12 for a distance equal to front cover 13 and upward from the support plate 12 for a distance substantially equal to that of right side plate 14. A back cover plate 17 extends downward from main support plate 12 for a distance equal to front cover 13 and upward from main support 12 for a distance substantially equal to side plates 14 and 16.

Base cabinet 11 may be located on a table 18 at suitable operating height. A motor cabinet 19 is located to the left of left side plate 16 and acts as a cover for a vertically located drive motor 20 attached to left side plate 16, and controlled by a motor control switch box 21 and start and stop push buttons 22 and 23.

Figure 3:
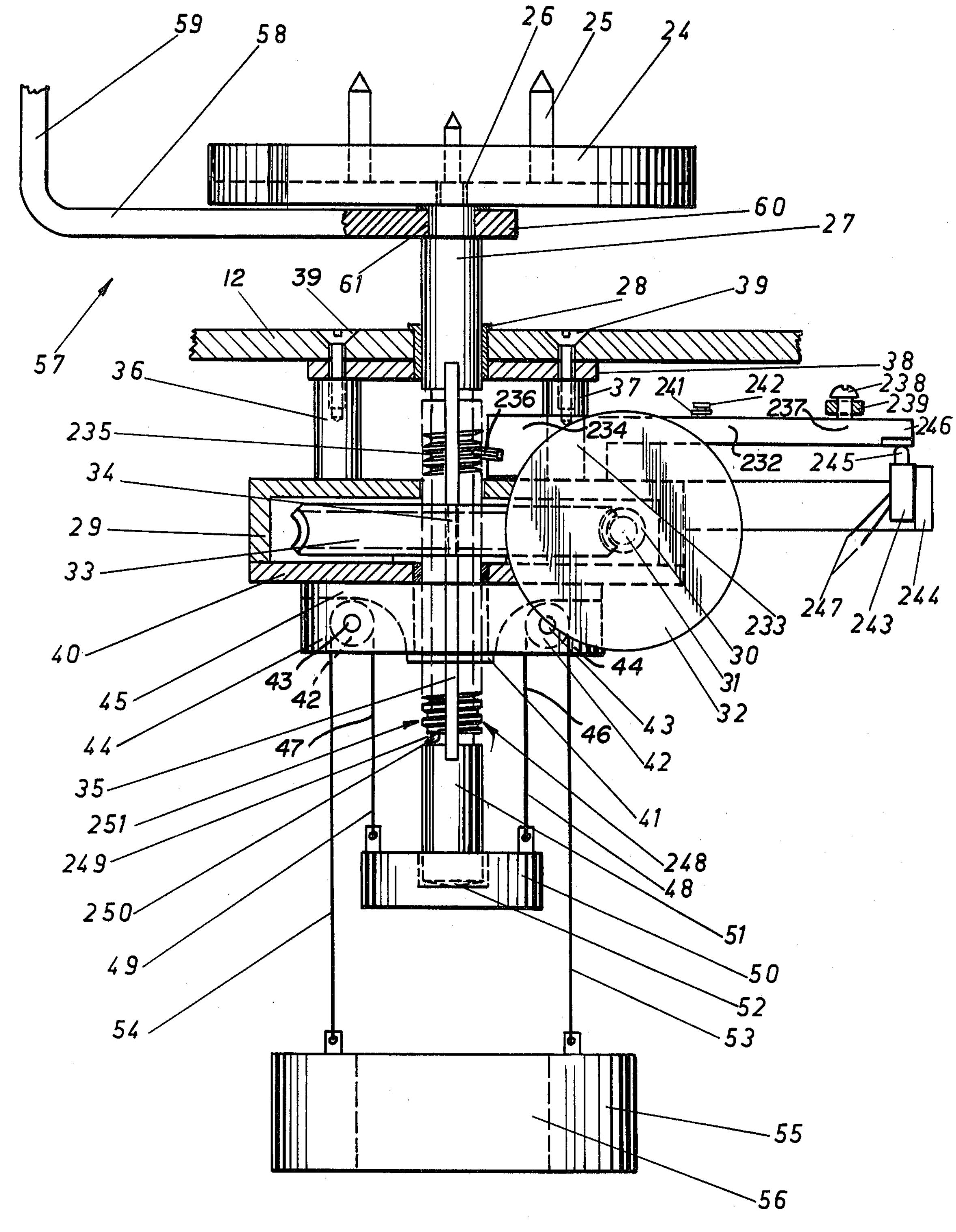
FIG. 3 is part sectional, side elevation of the spiked platform drive mechanism and return mechanism.

As illustrated in FIG. 3, a spiked platform 24 (also shown in FIG. 2) having a plurality of upwardly depending spikes 25 is located substantially horizontally above main support plate 12, detachably attached at 26 to an axially downwardly depending lead screw 27 axially slideable and journaled in a vertical bearing 28 located in main support plate 12. A gear box 29 contains a worm 30 attached to a horizontal spindle 31 journaled in gear box 29, one end of spindle 31 extending outward from gear box 29 to receive a ham drive pulley 32. A worm wheel 33 is slidingly journaled on lead screw 27 and contains a key 34 adapted to slidingly engage in a keyway 35 that is cut in lead screw 27. Gear box 29 is suspended beneath main support 12 by means of 2 posts, 36 and 37 and plate 38 in conjunction with screws 39.

Gear box 29 is closed off by a bottom plate 40 that contains a central bearing 41 that provides a lower sliding bearing in which lead screw 27 is slidably journaled, bearings 28 and 41 providing that lead screw 27 may slide up and down accurately and vertically. Two cord pulleys 42 are rotatably located on horizontal pins 43 in slots 44 in lower part 45 of bottom plate 40, two cords 46 and 47, each have one end 48 and 49 respectively attached to a yoke 50 in which lower end 51 of lead screw 27 is journaled and adapted to rotate on low friction point 52. Other ends, 53 and 54 respectively, of cords 46 and 47, are attached to a counter weight 55 that is heavy enough to more than counter balance the weight of the lead screw and parts attached thereto so that counter balance 55 will be able to force lead screw 27 to move to its upmost position when no other weight is located on spiked platform 24, yet is not strong enough to resist downward movement of spiked platform 24 upon a ham being located thereon. An axial hole 56 may be located in counterweight 55 to permit yoke 50 to proceed down into and through hole 56 as lead screw 27 progresses downwards.

A ham clamping bracket 57 has a horizontal portion 58 and an vertical portion 59, free end 60 of horizontal portion 58 containing a bore 61 that is journaled on lead screw 27 directly below spiked platform 24. As illustrated in FIGS. 1 and 8, upper end of 62 portion 59 contains a vertically elongated slot 63. As illustrated in FIG. 1, a bracket 64 comprises an upper horizontal portion 65 and a vertical portion 66. Free end 67 of horizontal portion 65 contains a bore 68 through which a shaft 69 is vertically journaled and held in place by collar **70*a* and supplied with an upper spiked plate 70 having a plurality of downward depending spikes 71, shaft 69 being located centrally above spiked platform 24 and having a common axis therewith. Vertical bracket portion 66 is attached to vertical portion 59 of bracket 57 by means of a bolt 72 (also shown on FIG. 8) that extends through slot 63 (also shown on FIG. 8) and permits bracket 64 to slide up and down on bracket 57 as far as slot 63 permits and allows bracket 64 to be fastened firmly to bracket 57 in any such permitted position, thereby facilitating the clamping of various sizes of hams between spikes 25 and spikes 71. A shaft support bracket 73 extends from upper end 74 to left side plate 16 and horizontally inward over axis of shaft 69 that is axially slideable through bearing 69*a* located in bracket 73 to provide support for shaft 69 as the ham slicing operation is carried on and to maintain axial alignment between lead screw 27 and shaft 69 during such slicing operation. A rod 58*a* extends up from main support plate 12 through hole 58*b* in horizontal portion 58 to restrain bracket 57 from rotating around lead screw 27**.

Referring particularly to FIG. 4, a main blade drive shaft 75 is journaled in a bore 76 in main support plate 12 and in bore 77 located in a drive shaft support plate 78 that is attached to angle bracket 79 by a bolt 80 located through a slot **80*a* in angle bracket 79 which permits slight tilting of main blade drive shaft to the left and to the right and forwards and backwards as the helix to be cut on a ham may require. Bores 77 and 76 are supplied with bearings 81 and 82 such as spherical bearings that permit such tilting of main blade drive shaft without binding. Angle bracket 79 is fastened onto left side plate 16 by bolt 83. Main blade drive shaft 75 is positioned relative to main support plate 12 by two collars 84 and 85 attached to main blade drive shaft 75 by screws 86 and 87, one collar on either side of main support plate 12**.

A substantially horizontal blade arm 88 has a vertical yoke 89 containing two bearings 90 and 91 through which upper end 92 of main blade drive shaft 75 is journaled and maintained in place by collars 93 and 94 by means of screws 95 and 96. A beveled gear 97 is fastened onto main blade drive shaft 75 by a screw 98, bevel gear 97 engaging with a horizontal bevel gear 99 fastened by means of a screw 100 to one end of a horizontal axle 101 journaled through a bearing 102 located in central portion 103 of yoke 89. A bearing lug 104 extends vertically downwards from horizontal blade arm 88, to encompass the other end 105 of horizontal axle 101, axle end 105 being journaled in a bearing 106 in bearing lug 104, a third beveled gear 107 being fastened onto extreme end 108 of axel 101 by a screw 109. A blade spindle 110 is journaled through bearing 111 in horizontal blade arm 88 and carries a substantially horizontal disk cutting blade 112 located above horizontal blade arm 88 and fastened to blade spindle 110 by means of a nut 113 threaded onto spindle 110. A fourth bevel gear 114 is attached to lower end 115 of blade spindle 110 to means of a screw 116, third bevel gear 107 and fourth bevel gear 115 thereby being maintained in proper engagement with each other. A substantially semicircular peripheral blade guard 117 and a blade cover 118 are detachably attached on top of blade arm 88 to facilitate removal for cleaning. Bevel gear covers 119 and 120 (shown in FIG. 1) may be located around bevel gears 97 and 99, and 107 and 114 to protect them against contamination from meat particles, etc. Blade cover 118 is cut away on its frontal side as shown at 121 (see FIG. 2) to prevent interference with the ham as the blade cuts down to the bone, and bevel gear cover 120 is set in close to bevel gears 107 and 114 to similarly prevent interference with the ham during slicing.

As illustrated in FIG. 2, extension spring means 122 has one end attached to right side plate 14 as shown at 123, spring means 122 extending over a pulley 124 located on a bracket 125 attached to left side plate 16 as shown at 126, a free end of spring means 122 being attached to far left end 127 of yoke 89 thereby biasing blade 112 toward a ham that may be located between spiked platform 24 and upper spiked plate 70.

The upper surface 128 of blade 112 is flat right out to circumferential cutting edge 129. Lower surface 130 of blade 112 is supplied with a peripherally beveled edge 131 to facilitate following a helix configuration cut into the ham during the spiral slicing operation.

Referring particularly to FIGS. 2, 6 & 9 the blade arm returning mechanism and blade arm retaining and releasing mechanism is shown comprising a blade arm return gear box 132 containing a worm wheel 133 adapted to rotate freely around a vertical flag spindle 134 that projects upwards through bore 135 and through main support plate 12 to a bearing 136 in a flag spindle support bracket 137 that is attached to left side plate 16 by bolt 138. A clutch dog 139 is axially slidable on lower end 140 of flag spindle 134 and on key 141 that is partially embedded in lower end 140 of flag spindle 134 and in a keyway 142 in clutch dog 139 to permit clutch dog 139 to drive flag spindle 134 yet slide in and out of engagement with a corresponding worm wheel clutch dog 143 as clutch dog 139 is biased up or down by a fork lever 144 having 2 tines 145 (only one shown in FIG. 6) that encompass clutch dog 139 and engage at diametrically opposite locations in an annular groove 146 in clutch dog 139. Fork lever 144 is pivoted in arm return gear box 132 on a horizontal pin 147 and is at its external end 148 connected to movable solenoid plungers 149 and 150 of solenoids 151 and 152 that respectively will move clutch dog 139 out of and into engagement with worm wheel clutch dog 143 upon solenoids 151 or 152 being electrically activated through wires 153 and 154 or wires 155 and 156. A base cover **132*a* closes arm return gear box 132, lower end 140 of flag spindle 134 being journaled in base cover 132*a* at 134*a***.

A collar 157 located on flag spindle 134 at lower end of worm wheel 133, inside worm wheel clutch dog 143, prevents worm wheel 133 from axial movement downwards on flag spindle 134 and in conjunction with a collar 158, attached to flag spindle 134 by a screw 159 directly above arm return gear box 132, maintains flag spindle 134 in proper vertical position. A flat 160 on flag spindle 134 has a flag plate 161 attached thereto by screws 162, the distal end of flag plate 161 having an upper end tapered to form a pawl as shown at 163 in FIGS. 2 and 6, adapted to engage with a corresponding pivotal arm release pawl 164 pivotally attached to a pivot block 165 to permit retention of pawl 163 upon arm release pawl 164 being biased toward flag plate 161 by a pawl spring 166, a drag arm 167, having one end attached to pawl 164 at 168, passing through spring 166 and left side plate 16 and having its other end 169 attached to a plunger 170 of an arm release solenoid 171 located on a bracket 172 attached externally of left side plate 16. A connecting cord 173 has one end attached to left end 127 of yoke 89 by bolt 174, the other end of connecting cord 173 being attached to pawl 163 by bolt 175, connecting cord 173 being of suitable length to retain blade 112 in a back position as shown at 176, out of engagement with a ham that might be located on spiked platform 24, yet will permit blade 112 to move in over spiked platform 24 sufficiently to reach a ham bone located thereon upon release solenoid 171 retracting arm release pawl 164 from engagement with pawl 163 as extension spring 122 biases blade 112 in over spike platform 24.

Referring particularly to FIGS. 5, 7 & 9 a double clutch mechanism is shown at 177 comprising a yoke shaped frame portion 178 having an extension arm 179 attached below main support plate 12 by bolts 180, a lower support plate 181 being attached below yoke 178 by means of a bolt 182 and a spacer 183 to provide a fork shaped unit having 3 tines, 184, 185, and 186. Three bores, 187, 188 and 189 are axially aligned through tines 184, 185, and 186, bore 187 carrying a rotable spindle 190 having a flag release clutch dog 191 at its lower end and a flag drive pulley 192 at its upper end. The middle tine, 185, carries a hollow rotatable spindle 193 that at its upper end is supplied with a platform drive dog 194 and has a platform drive pulley 195 attached at its lower end. A double clutch drive spindle 196 has its lower end journaled in bore 189 and its upper end journaled in a bore 197 in flag release clutch dog 191, double clutch drive spindle 196 passing freely through hollow spindle 193. A double selecting clutch dog 198 is slideably located on double clutch drive spindle 196 and driven by a key 199 that is sunk into double clutch drive spindle 196 and engages in a keyway in double clutch dog 198. Upper portion 200 of double selecting clutch dog 198 is adapted to slidingly engage or disengage with flag release clutch dog 191 and lower end portion 201 of double clutch dog 198 is adapted to slidingly engage or disengage with platform drive dog 194.

A drive selection lever 202 is pivotally attached at 203 to a bracket 204 that extends from yoke shaped frame 178, drive selection lever 202 having a fork configuration 205 at one extreme end thereof, fork 205 engaging in an annular groove 206 in double clutch dog 198 for sliding double clutch dog 198 into or out of engagement with flag release clutch dog 191 or platform drive dog 194, or for retaining double clutch dog 198 in a central, neutral position out of engagement with both flag release clutch dog 191 and platform drive dog 194. A spring loaded plunger **206*a* is biased by a spring 207 towards a concave, V-shaped configuration 208 at the other end of drive selection lever 202, to bias double clutch dog 198 to its neutral position. A solenoid 209 is attached to yoke shaped frame 178 and has its plunger 210 connected to drive selection lever 202 at 211 to move double clutch dog 198 down into engagement with spiked platform drive dog 194 upon solenoid 209 being activated through wires 212. An arm return solenoid 213 is located on central tine 185 and has its plunger 214 attached to drive selection lever 202 at 215 whereby double clutch dog 198 may be biased into engagement with flag release clutch dog 191 upon arm return solenoid 213 being electrically activated through wires 216**.

Referring particularly to FIGS. 5 & 9 the power drive train of the spiral meat slicer 10 comprises the drive motor 20 electrically connected to the motor control switch box 21 that is connected to a start and stop push button box 219, electrical power being supplied to switch box 21 by power cable 220. A double motor pulley 221 drives a jack shaft pulley 222 through belt 223 and double clutch belt pulley 224 (see also FIG. 7) through belt 225. Jack shaft 226 is journaled in bracket 227 that is attached below main support plate 12 by bolts 228. A second pulley 229 is attached to jack shaft 226 and drives main blade drive shaft 75 through a pulley 230 (see also FIG. 7) that is located on main blade drive shaft 75 below main support plate 12, and through a belt 231. Jack shaft 226 thereby reduces belt speed from motor 20 to main blade drive shaft 75 to a suitable level commensurate with correct blade speed at cutting edge 129 of blade 112.

Referring particularly to FIG. 3, a nut engaging arm 232 is horizontally pivotal on lower portion 233 of post 37, end 234 of nut engaging arm 232 closest to threaded portion 235 of lead screw 29 is supplied with a fractional nut portion 236 adapted to respectively engage and disengage with thread 235 upon end 234 being pivoted toward or away from lead screw 27. Opposite end 237 of nut engaging arm 232 carries a bolt 238 to which is attached a nut release lever 239 (see also FIG. 5) that extends out through front cover 13 where it ends in a knob 240. An extension spring 241 it is attached to a pin 242 located on nut engaging arm 232, the opposite end of extension spring 241 being attached to gear box 29 to bias fractional nut 236 toward and into thread 235. Manual pressure on knob 240 will act against extension spring 241 and pivot nut engaging arm 232 to move fractional nut 236 out of engagement with thread 235.

A microswitch 243 is attached to a bracket 244 that extends out from gear box 29, microswitch 243 having a plunger 245 adapted to be actuated by end 246 of nut engaging arm 232, in such a manner that circuit between wires 247 is closed upon fractional nut 236 being out of engagement or only in partial engagement with thread 235, whereas circuit between wires 247 becomes open upon fractional nut 236 entering into full depth in thread 235. Lower portion 248 of thread 235 of lead screw 27 is supplied with an annular groove 249 and a lead-in pin 250 adapted to force fractional nut 236 into engagement with thread 235 at lower end 248 of lead screw 27. Groove 249 is cut to the full depth of thread 235 whereas the first several lower threads 251 are cut to only substantially half the full depth of thread 235 to permit fractional nut 236, upon engagement in annular groove 249, to move end 246 of nut engaging arm 232 out of engagement with plunger 245, whereby fractional nut 236, upon lead screw 27 starting to rotate in its uppermost position, and forcing fractional nut 236 into half of the depth thread portion 251 by means of lead-in pin 250 will move end 246 of nut engaging arm 232 into engagement with plunger 245 of microswitch 243 thereby closing circuit between wires 247. As lead screw 27 rotates further, fractional nut 236 enters full depth portion of thread 235 bringing end 246 of nut engaging arm 232 again out of engagement with plunger 245 for the rest of the ham slicing operation.

Referring particularly to FIGS. 2, 6 & 9, a spring loaded plunger 251*a* is located axially in pivot block 165, biased towards a curved contact arm 252 by a spring 253, plunger 251*a* extending through left side plate 16 toward a microswitch 254, plunger 251*a* being adapted to actuate button 255 on microswitch 254 to close an electrical circuit that activates flag spindle release solenoid 151 to move clutch dog 139 out of engagement with worm wheel clutch dog 143 and thereby terminate return motion of blade 112, at the same time triggering stop button 22 to stop motor 20.

Referring further particularly to FIGS. 5, 6, and 7, belt 256 transmits drive from platform drive pulley 195 on double clutch mechanism 177, to ham drive pulley 32 through guide pulleys 257 upon platform drive dog 194 being engaged by double clutch dog 198. Another belt 258 transmits power from flag drive pulley 192 on double clutch mechanism 177, to a pulley 259 located on an axle 260 that is journaled in arm return gear box 132 and carries a worm 261 that drives worm wheel 133.

Referring particularly to FIGS. 1, 8 & 9, a stop bracket 262 is attached to vertical portion 66 of bracket 64, a suitable distance below upper spiked plate 70 to ensure that blade 112 does not reach spikes 71. A microswitch 263 is mounted on bracket 137 so that an actuating roller lever 264 may be contacted by stop bracket 262 as bracket 57 moves downward during spiral slicing operation whereby microswitch 263 is activated to stop rotation of spiked platform 24 and to initiate arm return operation.

METHOD OF OPERATION

Pushing knob 240 overcomes the force of extension spring 241 on nut engaging arm 232 which allow arm 232 to pivot about post 37 disengaging fractional nut 236 from thread 235. With fractional nut 236 out of engagement with lead screw 27, counterweight 55 is permitted to fall pulling spiked platform 24 by means of cords 47 and 48 and pulleys 42 to its upper start position (not shown).

A ham is then clamped between spikes 25 and 71. Start pushbutton 22 is depressed thereby providing electrical power to motor 20 which starts to rotate. Rotation of motor 20 causes rotation of double motor pulley 221 which drives belt 225. Belt 225 in turn causes the rotation of double clutch belt pulley 224. Double clutch belt pulley 224 drives double clutch drive spindle 196 which is slideably keyed to double selecting clutch dog 198 by key 199 thus causing double clutch dog 198 to rotate.

With the spiked platform 24 in its upper start position, the roller lever 264 micro switch 263 is not depressed by stop bracket 262. When micro switch 263 is in such a condition, power is supplied through micro switch 263 to energize solenoid 209 which retracts plunger 210 pivoting drive selection lever 202 so that rotating double selecting clutch dog 198 slides downward on double clutch drive spindle 196 into engagement with platform drive dog 194. With double selecting clutch dog 198 in engagement with platform drive dog 194, platform drive dog 194 is caused to rotate with double selecting clutch dog 198. Platform drive dog 194 causes platform drive pulley 195 to rotate thus driving belt 256. Belt 256 drives ham drive pulley 32 which causes spiked platform 24 to rotate through worm 30 and worm wheel 33 which is keyed to lead screw 27.

When drive motor 20 rotates it also drives belt 223 which causes jack shaft pulley 222 to rotate. Jack shaft pulley 222 in turn causes jack shaft 226 to rotate which causes second pulley 229 to rotate driving belt 231. Belt 231 drives pulley 230 which causes cutting blade 112 to rotate through main blade drive shaft 75, bevel gears 97 and 99, horizontal axial 101, bevel gears 107 and 114 and blade spindle 110.

When spiked platform 24 has moved to its upper start position and knob 240 is released, extension spring 241 brings fractional nut 236 into annular groove 241 and lead screw 27 by causing nut engaging arm 232 to pivot about post 37. This also causes end 246 of arm 232 to be out of engagement with plunger 245 on microswitch 243 which keeps arm release solenoid 171 deenergized when start button 22 is operated as described above. Since lead screw 27 is rotating as described above, the fractional nut 236 will contact the lead-in pin 250 in annular groove 249 causing the fractional nut 236 to become engaged with lower threads 251 of lead screw 27. As mentioned previously, the first several lower threads 251 are only approximately one-half the depth of the rest of the threaded portion 235 of lead screw 27. The engagement of fractional nut 236 with these shallow threads causes nut engaging arm 232 to pivot about post 37 such that end 246 of arm 232 moves into engagement with plunger 245 on microswitch 243. The actuation of plunger 245 closes a circuit providing power to energize arm release solenoid 171.

When arm release solenoid 171 is energized, plunger 170 is retracted toward solenoid 171 pulling drag arm 167 with it. Since drag arm 167 is attached to arm release pawl 164, pawl 164 is pivoted out of engagement with pawl 163 on flag plate 161. Since curved contact arm 252 is not in contact with plunger **251*a* during start up of the spiral meat slicer 10, solenoid 151 is not energized through microswitch 264. Also solenoid 152 is not energized through micro switch 263 since roller lever 264 has not yet been actuated. With solenoid 152 deenergized, vertical flag spindle 134 and flag plate 161 are free to rotate in a clockwise direction in response to the pulling force of extension spring means 122 on connecting cord 173 attached to bolt 175 on flag plate 161. With the tension on connecting cord 173 released, extention spring means 122 causes blade arm 88 to pivot swinging cutting blade 112 toward the ham located on spiked platform 24** beginning the spiral slicing of the ham.

As lead screw 27 continues to rotate, fractional nut 236 enters the full thread depth of threaded portion 235. As fractional nut 236 becomes fully engaged with threads 235 nut engaging arm 236 is pivoted so that end 246 of arm 236 becomes disengaged from plunger 245 of microswitch 243. With plunger 245 not engaged, the circuit to solenoid 171 is opened permitting arm release pawl 164 to return to its original position. Location of stop bracket 262 relative to spiked platform 24 depends on length of harm located between spikes 25 and spikes 71. A short ham will, therefore, have fewer slices than a long ham, since bracket 262 will automatically stop the slicing operation at a predetermined distance from spikes 71, thereby acting as an automatic gauging system to gauge the ham and permit the maximum number of slices on each ham independent of its length. Upon stop bracket 262 contacting roller lever 264 of microswitch 263, current to solenoid 212 is cut off, and instead supplied to arm return solenoid 213 whereby platform drive dog 194 is disengaged to stop rotation of spiked platform 24 and flat release dog 191 is engaged with double selecting dog 198 to transmit the rotation or double clutch belt pulley 224 to flag drive pulley 191. Flag drive pulley 192 drives belt 258 which drives pulley 259. Pulley 259 causes worm 261 to rotate which drives 133. At the same time current is supplied to solenoid 152 whereby clutch dog 139 is engaged with worm wheel clutch dog 143 causing the rotation of worm wheel 133 to be transmitted to vertical flag spindle 134. Flag spindle 134 in turn drives flag plate 161 with pawl 163, back towards its start position where pawl 163 moves back past arm release pawl 164 that is momentarily pushed back by pawl 163, whereafter further motion of flag plate 161 that also carries curved contact arm 252, will cause contact arm 252 to depress plunger 251 and activate microswitch 254 to power flag spindle release solenoid 151 whereby clutch dog 139 is drawn out of engagement with worm wheel clutch dog 143 (simultaneously solenoid 152 has been deenergized as described below) whereafter extension spring 122 pulls pawl 163 out into engagement with pawl 164 that, through cord 173, retains blade 112 in its backward position. Actuation of microswitch 254 has also triggered stop button 22 to stop motor 20 which also terminates power to solenoid 152 through micro switch 263 whereafter the fully automatic slicing operation is completed and all operating mechanisms of spiral meat slicer are stopped. The fully sliced ham may now be unclamped and removed from the machine.

It will be understood that although specific embodiments of the invention have herein been described and illustrated, it is recognized that departures may be made therefrom within the scope of the invention which is therefore not to be limited to the details disclosed herein as the invention also contemplates variations in design as may hold within the scope of the appended claims.

Having thus described my invention, I claim:

1. A spiral meat slicer for automatically forming a continuous spiral slice on a cut of meat having an irregularly shaped bone extending therein, comprising means for mounting said cut of meat on a rotatable platform, with said bone as a substantially vertical axis about which to rotate said cut of meat, means for clamping said cut of meat on said rotatable platform, blade support means pivotally mounted in said spiral meat slicer for rotation about an axis substantially parallel to rotative axis of said rotatable platform, said blade support means pivoting in a stationary, substantially horizontal plane, a disk blade mounted rotatably and substantially horizontally on said blade support means, drive motor means mounted on said spiral meat slicer, means for rotating said rotatable platform and means for moving said rotatable platform vertically upwards with respect to said blade to spirally slice said cut of meat, means for automatically engaging and disengaging said means for rotating and moving said rotatable platform upwards, means for moving said rotatable platform up to uppermost start position after said cut of meat has been sliced, means for selectively retaining said blade away from said rotational axis of said rotational platform, means for selectively releasing said retaining of said blade, means for biasing said blade toward said rotational axis of said rotational platform, transmission means from said drive motor means to said blade to rotate said blade and to said rotatable platform to rotate said rotatable platform and to move said rotatable platform vertically upwards and electric circuit means including switches and solenoids for rendering operation of said spiral meat slicer automatic.

2. A spiral meat slicer as claimed in claim 1, in which said rotatable platform carries a substantially C-shaped, telescoping clamping means for clamping said cut of meat on said rotatable platform and means for restraining said clamping means from rotation upon said rotatable platform being rotated.

3. A spiral meat slicer as claimed in claim 1 in which said means for rotating and moving said rotatable platform upwards comprises a lead screw having a thread, said lead screw being attached vertically below said platform, a fractional nut automatically engageable with said lead screw, said fractional nut being located at one end of a pivotable lever to pivot into and out of engagement with said lead screw, and means for moving said fractional nut into and out of engagement with said lead screw.

4. A spiral meat slicer as claimed in claim 3 in which said lead screw has a lower portion of thread cut substantially less deep than thread above said lower portion, other end of said pivotable lever deactivating and activating blade release means upon said fractional nut entering into and out of said thread above said lower portion to permit said blade to move in towards said vertical axis of said rotatable platform, stopping said slicing operation at a predetermined distance from an upper end of said cut of meat independent of vertical length of said cut of meat, means for automatically retracting said blade away from said cut of meat upon said spiral slicing operation having been completed, transmission means from said drive motor to said lead screw to rotate said platform, transmission means from said drive motor to said blade retraction means, selective means for automatically connecting said transmission means to said lead screw during slicing operation and automatically disconnecting said connection to said lead screw and instead automatically connecting said transmission means to said blade retraction means upon said slicing operation being completed, means for automatically initiating said retraction of said blade, means for secession of said retraction of said blade upon said blade having become fully retracted and means for automatically stopping said drive motor upon said retraction of said blade having been completed.

5. A spiral meat slicer for automatically forming a continuous spiral slice on a cut of meat having an irregularly shaped bone extending therein, comprising, in combination:

- a plurality of upward spikes on a rotatable platform on which a cut of meat is mounted;
- a substantially c-shaped telescoping clamping means for clamping the meat on the rotatable platform;
- means for restraining said clamping means from rotation when the platform is rotated;
- blade support means pivotally mounted in said spiral meat slicer such that it can rotate about an axis parallel to the rotational axis of the rotatable platform;
- a disk blade having a peripheral cutting edge mounted rotatably and substantially horizontally on said blades support means, said disk blade having a flat upper surface and an under surface bevel along said peripheral cutting edge;
- a single drive motor mounted on said spiral meat slicer, but not on said blade support means;
- a start/stop switch to operate said drive motor;
- transmission means from said drive motor to said blade including speed reduction means;
- means for rotating said platform;
- a lead screw having a thread, said lead screw being attached vertically below said platform;
- a fractional nut automatically engagable with said lead screw;
- a pivotable lever with the fractional nut located at one end which is pivoted in and out of engagement with said lead screw, the other end of said lever deactivating and activating a blade release switch means when the fractional nut enters into and out of said thread, respectively;
- spring means biasing the fractional nut toward the lead screw;
- manual lever means for moving said fractional nut out of engagement with said thread;
- counterweight means for lifting said platform up to its upper start position when said manual lever has been actuated to move said fractional nut out of engagement with said screw;
- means for automatically retaining said blade in a position away from said clamping means while said cut of meat is being clamped therein;
- means for automatically releasing said means for retaining said blade upon said fractional nut engaging a lower portion of the thread of the lead screw after the start button has been actuated, said blade retaining means being controlled by said blade release switch means;
- a bracket attached to an upper part of the C-shaped telescoping clamping means, the bracket being adapted to actuate a stop switch which controls solenoid valves which actuate a double acting clutch means selectively to connect the transmission means to said lead screw during slicing operation and automatically disconnecting the transmission means to said lead screw and connecting the transmission means to a blade retraction means comprising retraction clutch means for selectively engaging a rotatable spindle supplied with an outwardly extending flag, a free end of said flag being connected to one end of said blade support by cord means, to permit said blade support to move said disk blade away from said cut of meat upon said retraction clutch means being engaged to rotate said rotatable spindle, said means for said secession of said retraction of said blade comprising solenoid means for disengaging said retraction clutch means, controlled by switch means engaged and disengaged by lever means located on said flag, said stop switch means simultaneously comprising means for automatically initiating said retraction of said blade;
- transmission means from said drive motor to said lead screw to rotate said platform;
- transmission means from said drive motor to said blade retraction means;
- means for secession of said retraction of said blade upon said blade having become fully retracted, comprising solenoid means for disengaging said retraction clutch means, controlled by switch means engaged and disengaged by lever means located on said flag; and means for automatically stopping said drive motor upon said retraction of said blade having been completed.

6. A spiral meat slicer comprising:

a base cabinet having a left, right and back cover plates extending vertically from a table and enclosing a main support plate on and through which the mechanisms of the meat slicer are mounted;

a threaded lead screw with non-treaded portions at either end, the threaded portion of said lead screw having an annular groove and threaded portion in which the thread depth is less than that of the remaining threaded portion, said lead screw extending through the main support plate;

a spiked platform attached to said lead screw;

a worm wheel mounted coxially on and with said lead screw, within a gear box which is mounted to the underside of the main support blade, said worm wheel being slightably keyed to the lead screw;

a yoke in which a lower end of the lead screw rests, said yoke being connected to a counter weight by means of cords running through cord pulleys mounted on the lower part of the gear box;

a nut engaging arm pivotally mounted on said gear box;

a fractional nut mounted on one end of said nut engaging arm such that the fractional nut is capable of engaging the threads of the lead screw and the opposite end of said nut engaging arm being capable of contact with a microswitch mounted on a bracket attached to the gear box;

an extension spring, one end of which is attached to the nut engaging arm at a point on the side of the pivot point of said arm opposite the functional nut such that said nut is biased toward said lead screw, the other end of said spring attached to the gear box;

a nut release lever attached to the nut engaging arm and extending through the front cover of the slicer such that operation of the lever causes the fractional nut to be disengaged from said lead screw until the lever is released;

a worm engaged perpendicularly with said worm wheel and extending through said gear box in the form of a horizontal spindle;

a ham drive pulley connected to said horizontal spindle, said ham drive pulley being driven by a belt connected to a platform drive pulley such that when the platform drive pulley is rotated the spiked platform rotates;

a platform drive dog connected to the platform drive pulley, said platform dog selectively engagable with a double selecting clutch dog such that the rotation of a double clutch belt pulley is transmitted to the platform drive pulley;

a drive motor whose rotation drives a belt connected to the double clutch belt pulley;

a flag release clutch dog connected to a flag drive pulley, said flag release clutch dog selectively engagable with said double selecting clutch dog such that the rotation of said double clutch belt pulley is transmitted to the flag drive pulley;

a pivotively mounted drive selection lever which is biased to maintain double selecting clutch dog in a neutral position between said platform drive dog and flag release clutch dog, the position of said lever being controlled by a pair of solenoids which are energized to move double selecting clutch dog into engagement with either the platform drive dog or flag release clutch dog, the solenoids being mounted on a yoke which also supports the flag drive pulley, the platform drive pulley and double clutch belt pulley, said yoke being mounted to the underside of the main support plate;

a belt running through flag drive pulley which connects said pulley to a pulley which rotates a worm to drive a worm wheel actually mounted within a blade arm return gear box about a flag spindle, the lower portion of said worm wheel being formed into a worm wheel clutch dog, said gear box being mounted to the underside of the main support plate;

a clutch dog slidingly keyed to the flag spindle and whose position is controlled by a pair of solenoids which position a fork lever such that said clutch dog is either out of engagement with said such worm wheel clutch dog or in engagement with said worm wheel clutch dog. In which case of the worm wheel is transmitted to said flag spindle which positions a flag when an arm release pawl as been retracted out of contact with the flag plate by a solenoid, said solenoid and pawl being mounted on the left side plate;

a spring loaded plunger which is mounted in a block mounted on the left plate below the arm release pawl such that when a curved contact arm fixed to the flag plate actuates said plunger the opposite end of said plunter actuates a microswitch mounted on a plate attached to the left side plate;

a connecting cord one end of which is attached to said flag plate and the other end of which is attached to one end of a blade arm, such that when the tension on said cord is relaxed, a spring means also attached to the same end of the blade arm causes the blade arm to rotate a cutting blade toward the spiked platform;

a pair of bevel gears, a horizontal axle, a second set of bevel gears and main blade drive shaft by which rotation is transmitted to said cutting blade from the rotation of a pulley driven by a belt which is in turn driven by said drive motor, said bevel gears, axle and drive shaft being supported by bracket mounted on the left side plate;

a ham clamping bracket is attached to the spiked platform such that said bracket does not rotate when the spiked platform does;

a bracket attached to said ham clamping bracket such that the position of said bracket with respect to said ham clamping bracket can be slidingly adjusted;

an upper spiked plate attached to said bracket;

a stop bracket mounted on said bracket in a fixed position with respect to said upper spiked plate;

a microswitch with roller lever mounted such that it can be contacted by said stop bracket during operation of the slicer;

a start/stop switch electrically connected to a motor and slicer control circuit;

whereby upon start-up of the slicer a cut of meat mounted on the spiked platform is rotated and lowered past a rotating cutting blade which engages and spirally slices said meat until the stop bracket operates its microswitch causing the blade and spiked platform to stop rotating and returning the blade to its original retracted position.

* * * * *